US012799023B2

(12) United States Patent
Rampf et al.

(10) Patent No.: US 12,799,023 B2
(45) Date of Patent: Nov. 17, 2026

(54) GLASS CERAMIC WITH QUARTZ SOLID SOLUTION PHASE

(71) Applicant: Ivoclar Vivadent AG, Schaan (LI)

(72) Inventors: Markus Rampf, Seewis-Dorf (CH); Marc Dittmer, Feldkirch (AT); Christian Ritzberger, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 548 days.

(21) Appl. No.: 18/547,585

(22) PCT Filed: Feb. 17, 2022

(86) PCT No.: PCT/EP2022/054010

§ 371 (c)(1),
(2) Date: Aug. 23, 2023

(87) PCT Pub. No.: WO2022/179936

PCT Pub. Date: Sep. 1, 2022

(65) Prior Publication Data

US 2024/0300851 A1 Sep. 12, 2024

(30) Foreign Application Priority Data

Feb. 24, 2021 (EP) .................................... 21159118

(51) Int. Cl.

| | |
|---|---|
| ***C03C 10/00*** | (2006.01) |
| ***A61C 5/77*** | (2017.01) |
| ***A61C 13/00*** | (2006.01) |
| ***C03B 32/00*** | (2006.01) |
| ***C03B 32/02*** | (2006.01) |
| ***C03C 4/00*** | (2006.01) |

(52) U.S. Cl.

CPC ............ *C03C 10/0009* (2013.01); *A61C 5/77* (2017.02); *A61C 13/0004* (2013.01); *A61C 13/0021* (2013.01); *C03B 32/005* (2013.01); *C03B 32/02* (2013.01); *C03C 4/0021* (2013.01); *C03C 10/00* (2013.01); *C03C 2204/04* (2013.01)

(58) Field of Classification Search

CPC ........................ C03C 10/0009; C03C 10/0027

See application file for complete search history.

(56) References Cited

U.S. PATENT DOCUMENTS

| | | | | |
|---|---|---|---|---|
| 5,219,799 | A | 6/1993 | Beall et al. | |
| 10,407,341 | B2 * | 9/2019 | Vollmann | A61C 13/0022 |
| 10,457,589 | B2 * | 10/2019 | Rampf | C03C 10/0027 |
| 2003/0099062 | A1 | 5/2003 | Kataoka et al. | |
| 2004/0180773 | A1 | 9/2004 | Schreder et al. | |
| 2007/0281849 | A1 | 12/2007 | Yagi | |
| 2007/0293386 | A1 | 12/2007 | Goto | |
| 2008/0248316 | A1 | 10/2008 | Goto et al. | |
| 2011/0030423 | A1 | 2/2011 | Johannes et al. | |
| 2013/0149433 | A1 * | 6/2013 | Ehrt | C04B 35/62665 427/2.29 |
| 2016/0113845 | A1 | 4/2016 | Fecher et al. | |
| 2017/0119508 | A1 | 5/2017 | Dittmer et al. | |
| 2018/0037493 | A1 | 2/2018 | Schneider et al. | |
| 2018/0099900 | A1 | 4/2018 | Vollmann et al. | |
| 2018/0244564 | A1 | 8/2018 | Ritzberger et al. | |
| 2019/0160201 | A1 | 5/2019 | Deng et al. | |
| 2019/0202731 | A1 | 7/2019 | Yamamoto et al. | |
| 2019/0300426 | A1 | 10/2019 | Fu et al. | |
| 2020/0055764 | A1 | 2/2020 | Duffy et al. | |

FOREIGN PATENT DOCUMENTS

| | | | | |
|---|---|---|---|---|
| CN | 104108883 | A | 10/2014 | |
| CN | 111875256 | A * | 11/2020 | A61K 6/827 |
| CN | 111943514 | A | 11/2020 | |
| DE | 2507131 | A1 | 9/1975 | |
| DE | 102014104401 | A1 * | 10/2015 | A61K 6/833 |
| EP | 231773 | A1 | 8/1987 | |
| GB | 924996 | A * | 5/1963 | C03C 10/0009 |
| GB | 2172282 | A | 9/1986 | |
| JP | 2000063144 | A | 2/2000 | |
| WO | 2012/143137 | A1 | 10/2012 | |

OTHER PUBLICATIONS

Dittmer, M., et al., Colorless and high strength MgO/Al2O3/SiO2 glass-ceramic dental material using zirconia as nucleating agent, J Biomed Mater Res Part B, Nov. 21, 2011, vol. 100B, No. 2, pp. 463-470.

Marc Dittmer, Glasses and Glass-Ceramics in the System MgO—Al2O3—SiO2 with ZrO2 as Nucleating Agent, Dissertation for doctorate, Nov. 2, 2011, Summary, Friedrich Schiller University Jena.

Glass Handbook, written by Sakuka Jifu et al., translated by Jiang Guodong, China Building Industry Press, Beijing, Apr. 1985, pp. 160-162.

* cited by examiner

*Primary Examiner* — Noah S Wiese

(74) *Attorney, Agent, or Firm* — Ann M. Knab; Thad McMurray

(57) ABSTRACT

Quartz solid solution glass ceramics and precursors thereof are described, which are characterized by very good mechanical and optical properties and can be used in particular as restorative materials in dentistry.

23 Claims, No Drawings

GLASS CERAMIC WITH QUARTZ SOLID SOLUTION PHASE

CROSS-REFERENCE TO RELATED APPLICATIONS

This application is a National Stage application of International patent application No. PCT/EP2022/054010 filed on Feb. 17, 2022, which claims priority to European patent application No. 21159118.5 filed on Feb. 24, 2021, the disclosures of which are incorporated herein by reference in their entirety.

FIELD OF THE INVENTION

The invention relates to glass ceramic with a quartz solid solution phase, which is in particular suitable for use in dentistry and preferably for the production of dental restorations, and to precursors for the production of these glass ceramics.

The invention relates to glass ceramic with a quartz solid solution phase, which is in particular suitable for use in dentistry and preferably for the production of dental restorations, and to precursors for the production of these glass ceramics.

Glass ceramics with a quartz solid solution phase are basically known from the prior art.

DE 25 07 131 A1 describes special magnesium aluminosilicate glass ceramics containing 20 to 35 wt.-% $Al_2O_3$ and 9 to 15 wt.-% MgO. Bodies made from the glass ceramics have a heterogeneous structure in that the crystal structure of the surface layer differs from that of the interior of the bodies. The surface compressive stress generated in this way has a significant influence on the mechanical properties, so that machining of the surface layer would result in a deterioration of the mechanical properties. High quartz solid solutions were detected in the surface layer and low quartz solid solutions in the interior of the bodies.

JP 2000/063144 A discloses magnesium aluminosilicate glasses for the preparation of substrates for storage media containing 30 to 60 mol % $SiO_2$ and large amounts of $B_2O_3$.

GB 2 172 282 A describes magnesium aluminosilicate glass ceramics containing 10 to 40 wt.-% $Al_2O_3$. The glass ceramics are intended for microelectronic applications and in particular as a coating for substrates such as aluminum, and in addition to high strength they have a suitable dielectric constant in the range from 7 to 10 and a high electrical resistance.

WO 2012/143137 A1 describes glass ceramic bodies containing at least 10.1 wt.-% $Al_2O_3$ and having different crystal phases in different areas.

In the article by M. Dittmer and C. Russel in J. Biomed. Mater. Res. Part B: 100B: 463-470 (2012), glass ceramics with high quartz or low quartz solid solution phase as main crystal phase are described, which contain at least 25.9 wt.-% $Al_2O_3$ All in all, the strengths achieved with these known glass ceramics and also their optical properties are not completely satisfactory for an application as dental material.

SUMMARY

The invention is therefore based on the problem of providing a glass ceramic that has a combination of high strength and good translucency. The glass ceramic should also have a coefficient of thermal expansion that can be adjusted over a wide range. The glass ceramic should also be easy to process into dental restorations and thus be suitable in an excellent manner as restorative dental material.

This problem is solved by the glass ceramic with quartz solid solution phase according to the claims. Also subject of the invention are the starting glass and processes according to the claims 20.

DETAILED DESCRIPTION

The glass ceramic according to the invention is characterized in that it comprises the following components

| Component | Wt.-% |
|---|---|
| $SiO_2$ | 54.1 to 67.0 |
| $Li_2O$ | 13.1 to 18.5 |
| $K_2O$ | 0.1 to 2.0 |
| $Al_2O_3$ | 1.6 to 4.0 |
| $P_2O_5$ | 4.1 to 6.5 |
| $ZrO_2$ | 7.0 to 13.5 |

and comprises at least one quartz solid solution phase.

This glass ceramic, hereinafter also referred to as "glass ceramic with quartz solid solution phase", surprisingly exhibits an advantageous combination of mechanical and optical properties desirable for a restorative dental material. The glass ceramic has high strength and yet it can be easily given the shape of a dental restoration by pressing or machining. Furthermore, it was not expected that by providing one or more quartz solid solution phases, very good optical properties could nevertheless be achieved. This is because many secondary crystal phases have a negative effect on the optical properties of glass ceramics. For example, they can reduce translucency and they can also impair the possibility to impart color to the glass ceramic, which can lead to considerable difficulties in imitating the color of the natural tooth material to be replaced.

Furthermore, it has been shown that the thermal expansion coefficient of the glass ceramics according to the invention can be varied over a wide range by the type and amount of quartz solid solution phase formed. Finally, it was also found that the glass ceramics according to the invention can be densely sintered at higher temperatures compared to lithium silicate-quartz glass ceramics without losing their shape.

The term "quartz solid solution phase" refers to a crystal phase of $SiO_2$ in which foreign atoms are incorporated into the lattice of the $SiO_2$ either in interstitial sites or in lattice sites. These foreign atoms can be in particular Al as well as Li, Mg and/or Zn. Al can preferably be present in a molar concentration corresponding to the sum of the molar concentration of Li, double the molar concentration of Mg and double the molar concentration of Zn.

In a preferred embodiment, the glass ceramic contains at least two different quartz solid solution phases.

The at least one quartz solid solution phase may be either a stoichiometric or a non-stoichiometric quartz solid solution phase. By stoichiometric quartz solid solution phases are meant those crystal phases in which the number of silicon atoms and the number of one of the foreign atoms are in the ratio x:y, where x and y are integers in the range from 1 to 8 and in particular in the range from 1 to 5. In a preferred embodiment, the glass ceramic contains at least one and preferably at least two non-stoichiometric quartz solid solution phases.

The at least one quartz solid solution phase may be a stoichiometric or non-stoichiometric aluminosilicate crystal phase. In a preferred embodiment, the glass ceramic contains at least one and preferably at least two stoichiometric or non-stoichiometric aluminosilicate crystal phases. In a particularly preferred embodiment, the glass ceramic contains at least one and preferably at least two non-stoichiometric aluminosilicate crystal phases. In this context, stoichiometric aluminosilicate crystal phases are understood to be those crystal phases in which the number of silicon atoms and the number of aluminum atoms are in the ratio x:y, where x and y are integers in the range from 1 to 8 and in particular in the range from 1 to 5. Examples of stoichiometric aluminosilicate crystal phases are eucryptite ($LiAlSiO_4$), spodumene ($LiAlSi_2O_6$), petalite ($LiAlSi_4O_{10}$) and cordierite ($Mg_2Al_4Si_5O_{18}$).

The quartz solid solution phases of the glass ceramic according to the invention can be detected in particular by X-ray powder diffraction using Cuka radiation. The quartz solid solution phases show characteristic peak patterns, each of which is derived from the peak pattern of low quartz but is shifted to different 20 values.

The glass ceramic with quartz solid solution phase according to the invention contains in particular 57.0 to 66.5, preferably 59.0 to 66.0 and particularly preferably 62.1 to 65.5 wt.-% $SiO_2$.

It is further preferred that the glass ceramic according to the invention contains 13.3 to 18.0, preferably 16.1 to 17.5 and particularly preferably 16.5 to 17.0 wt.-% $Li_2O$. It is assumed that $Li_2O$ lowers the viscosity of the glass matrix and thus promotes crystallization of the desired phases.

It is also preferred that the glass ceramic contains 0.5 to 1.7, preferably 1.1 to 1.5 and particularly preferably 1.2 to 1.4 wt.-% $K_2O$.

In a preferred embodiment, the glass ceramic according to the invention contains 2.0 to 3.8 and preferably 1.6 to 3.6 wt.-% $Al_2O_3$.

In another preferred embodiment, the glass ceramic contains 4.3 to 6.0, preferably 4.5 to 5.9 and particularly preferably 5.1 to 5.8 wt.-% $P_2O_5$. It is assumed that the $P_2O_5$ acts as nucleating agent.

It is further preferred that the glass ceramic contains 7.2 to 13.0 and preferably 9.0 to 12.0 wt.-% $Zro_2$.

It is also preferred that the glass ceramic contains 1.0 to 8.0, preferably 1.0 to 5.5 and particularly preferably 1.5 to 2.5 wt.-% oxide of monovalent elements $Me_2^IO$ selected from the group of $Na_2O$, $Rb_2O$, $Cs_2O$ and mixtures thereof.

Particularly preferably, the glass ceramic contains at least one and in particular all of the following oxides of monovalent elements $Me_2^IO$ in the amounts indicated:

| Component | Wt.-% |
|---|---|
| $Na_2O$ | 0 to 2.0 |
| $Rb_2O$ | 0 to 8.0 |
| $Cs_2O$ | 0 to 7.0. |

The glass ceramic according to the invention preferably contains 0.05 to 5.0, in particular 0.07 to 1.5, preferably 0.08 to 1.0, more preferably 0.09 to 0.4 and most preferably 0.1 to 0.2 wt.-% oxide of divalent elements Mello selected from the group of Cao, MgO, Sro, ZnO and mixtures thereof, wherein the $Me^{II}O$ is preferably MgO. It is believed that oxides of divalent elements $Me^{II}O$ and especially MgO promote the formation of one or more quartz solid solution phases and avoid the formation of undesirable crystal phases, such as in particular cristobalite, which may have a detrimental effect on the coefficient of thermal expansion and the optical properties.

In another preferred embodiment, the glass ceramic contains less than 2.0 wt.-% of BaO. In particular, the glass ceramic is substantially free of BaO.

Preferably, the glass ceramic contains at least one and in particular all of the following oxides of divalent elements Mello in the amounts indicated:

| Component | Wt.-% |
|---|---|
| CaO | 0 to 3.0 |
| MgO | 0 to 5.0 |
| Sro | 0 to 5.0 |
| ZnO | 0 to 3.0 |

Further preferred is a glass ceramic containing 0 to 5.0, preferably 1.0 to 4.0, and particularly preferably 2.0 to 3.0 wt.-% oxide of trivalent elements $Me_2^{III}O_3$ selected from the group of $B_2O_3$, $Y_2O_3$, $La_2O_3$, $Ga_2O_3$, $In_2O_3$ and mixtures thereof.

Particularly preferably, the glass ceramic contains at least one and in particular all of the following oxides of trivalent elements $Me_2^{III}O_3$ in the amounts indicated:

| Component | Wt.-% |
|---|---|
| $B_2O_3$ | 0 to 4.0 |
| $Y_2O_3$ | 0 to 5.0 |
| $La_2O_3$ | 0 to 5.0 |
| $Ga_2O_3$ | 0 to 3.0 |
| $In_2O_3$ | 0 to 5.0 |

Furthermore, a glass ceramic is preferred which contains 0 to 10.0, and particularly preferably 0 to 8.0 wt.-% oxide of tetravalent elements $Me^{IV}O_2$ selected from the group of $TiO_2$, $SnO_2$, $CeO_2$, $GeO_2$ and mixtures thereof.

Particularly preferably, the glass ceramic contains at least one and in particular all of the following oxides of tetravalent elements $Me^{IV}O_2$ in the amounts indicated:

| Component | Wt.-% |
|---|---|
| $TiO_2$ | 0 to 4.0 |
| $SnO_2$ | 0 to 3.0 |
| $GeO_2$ | 0 to 9.0, in particular 0 to 8.0 |
| $CeO_2$ | 0 to 4.0. |

In another embodiment, the glass ceramic contains 0 to 8.0, preferably 0 to 6.0 wt.-% oxide of pentavalent elements $Me_2^VO_5$ selected from the group of $V_2O_5$, $Ta_2O_5$, $Nb_2O_5$ and mixtures thereof.

Particularly preferably, the glass ceramic contains at least one and in particular all of the following oxides of pentavalent elements $Me_2^VO_5$ in the amounts indicated:

| Component | Wt.-% |
|---|---|
| $V_2O_5$ | 0 to 2.0 |
| $Ta_2O_5$ | 0 to 5.0 |
| $Nb_2O_5$ | 0 to 5.0 |

In another embodiment, the glass ceramic contains 0 to 5.0, preferably 0 to 4.0 wt.-% oxide of hexavalent element $Me^{VI}O_3$ selected from the group of $WO_3$, $MoO_3$ and mixtures thereof.

Particularly preferably, the glass ceramic contains at least one and in particular all of the following oxides $Me^{VI}O_3$ in the amounts indicated:

| Component | Wt.-% |
|---|---|
| $WO_3$ | 0 to 3.0 |
| $MoO_3$ | 0 to 3.0 |

In a further embodiment, the glass ceramic according to the invention contains 0 to 1.0 and in particular 0 to 0.5 wt.-% fluorine.

Particularly preferred is a glass ceramic which contains at least one and preferably all of the following components in the amounts indicated:

| Component | Wt.-% |
|---|---|
| $SiO_2$ | 54.1 to 67.0 |
| $Li_2O$ | 13.1 to 18.5 |
| $K_2O$ | 0.1 to 2.0 |
| $Al_2O_3$ | 1.6 to 4.0 |
| $P_2O_5$ | 4.1 to 6.5 |
| $ZrO_2$ | 7.0 to 13.5 |
| $Me^{I}_2O$ | 1.0 to 8.0 |
| $Me^{II}O$ | 0 to 5.0 |
| $Me^{III}_2O_3$ | 1.0 to 8.0 |
| $Me^{IV}O_2$ | 0 to 10.0 |
| $Me^{V}_2O_5$ | 0 to 8.0 |
| $Me^{VI}O_3$ | 0 to 5.0 |
| Fluorine | 0 to 1.0, |

wherein $Me_2{}^{I}O$, $Me^{II}O$, $Me_2{}^{III}O_3$, $Me^{IV}O_2$, $Me_2{}^{V}O_5$ and $Me^{VI}O_3$ are as de-fined above.

In another particularly preferred embodiment, the glass ceramic comprises at least one and preferably all of the following components in the amounts indicated:

| Component | Wt.-% |
|---|---|
| $SiO_2$ | 54.1 to 67.0 |
| $Li_2O$ | 13.1 to 18.5 |
| $K_2O$ | 0.1 to 2.0 |
| $Al_2O_3$ | 1.6 to 4.0 |
| $P_2O_5$ | 4.1 to 6.5 |
| $ZrO_2$ | 7.0 to 13.5 |
| $Na_2O$ | 0 to 2.0 |
| $Rb_2O$ | 0 to 8.0 |
| $Cs_2O$ | 0 to 7.0 |
| CaO | 0 to 3.0 |
| MgO | 0 to 5.0 |
| SrO | 0 to 5.0 |
| ZnO | 0 to 3.0 |
| $B_2O_3$ | 0 to 4.0 |
| $Y_2O_3$ | 0 to 5.0 |
| $La_2O_3$ | 0 to 5.0 |
| $Ga_2O_3$ | 0 to 3.0 |
| $In_2O_3$ | 0 to 5.0 |
| $TiO_2$ | 0 to 4.0 |
| $SnO_2$ | 0 to 3.0 |
| $GeO_2$ | 0 to 9.0, in particular 0 to 8.0 |
| $CeO_2$ | 0 to 4.0 |
| $V_2O_5$ | 0 to 2.0 |
| $Ta_2O_5$ | 0 to 5.0 |
| $Nb_2O_5$ | 0 to 5.0 |
| $WO_3$ | 0 to 3.0 |
| $MoO_3$ | 0 to 3.0 |
| Fluorine | 0 to 1.0. |

Some of the above components may serve as colorants and/or fluorescent agents. The glass ceramic according to the invention may furthermore contain further colorants and/or fluorescent agents. These may be selected for example from $Bi_2O_3$ or $Bi_2O_5$ and in particular from further inorganic pigments and/or oxides of d and f elements, such as the oxides of Mn, Fe, Co, Pr, Nd, Tb, Er, Dy, Eu and Yb. By means of these colorants and fluorescent agents, it is possible to easily color the glass ceramic to mimic the desired optical properties, especially of natural dental material. It is surprising that this is easily possible despite the presence of one or more quartz solid solution phases.

In a preferred embodiment of the glass ceramic, the molar ratio of $SiO_2$ to $Li_2O$ is in the range of 1.5 to 6.0, in particular 1.55 to 3.0, preferably 1.6 to 1.8 and particularly preferably 1.65 to 1.75. Surprisingly, the preparation of the quartz solid solution phase glass ceramic of the invention is possible within these broad ranges.

It is further preferred that the glass ceramic according to the invention contains lithium disilicate or lithium metasilicate as further crystal phases and in particular as the main crystal phase. It is particularly preferred that the glass ceramic according to the invention contains lithium disilicate as further crystal phase and in particular as main crystal phase.

The term "main crystal phase" refers to the crystal phase which has the highest weight fraction of all crystal phases present in the glass ceramic. The amounts of the crystal phases are determined in particular by the Rietveld method. A suitable procedure for the quantitative analysis of the crystal phases by means of the Rietveld method is described for example in the dissertation by M. Dittmer "Gläser und Glaskeramiken im System MgO—$Al_2O_3$—$SiO_2$ mit $Zro_2$ als Keimbildner", University of Jena 2011.

It is preferred that the glass ceramic according to the invention comprises at least 20 wt.-%, preferably 25 to 55 wt.-% and particularly preferably 30 to 55 wt.-% lithium disilicate crystals.

It is further preferred that the glass ceramic according to the invention comprises 0.2 to 28 wt.-% and preferably 0.2 to 25 wt.-% quartz solid solution.

The glass ceramic with quartz solid solution phase according to the invention is characterized by particularly good mechanical properties and optical properties, and it can be formed by heat treatment of a corresponding starting glass or a corresponding starting glass with nuclei. These materials can therefore serve as precursors for the glass ceramic with quartz solid solution phase according to the invention.

The type and in particular the amount of crystal phases formed can be controlled by the composition of the starting glass as well as the heat treatment applied to produce the glass ceramic from the starting glass. The examples illustrate this by varying the composition of the starting glass and the heat treatment applied.

The glass ceramic has a high biaxial fracture strength of preferably at least 200 MPa and particularly preferably 250 to 460 MPa. The biaxial fracture strength was determined in accordance with ISO 6872 (2008) (piston-on-three-balls test).

The glass ceramic according to the invention has a coefficient of thermal expansion CTE (measured in the range from 100 to 500° C.) of in particular 3.0 to $14.0 \cdot 10^{-6}$ $K^{-1}$, preferably 5.0 to $14.0 \cdot 10^{-6}$ $K^{-1}$ and particularly preferably 7.0 to $14.0 \cdot 10^{-6}$ $K^{-1}$. The CTE is determined according to ISO 6872 (2008). Adjustment of the coefficient of thermal expansion to a desired value is effected in particular by the type and amount of crystal phases present in the glass ceramic and by the chemical composition of the glass ceramic.

The translucency of the glass ceramic was determined in terms of the contrast value (CR value) according to British Standard BS 5612, and this contrast value was preferably 40 to 92.

The particular combination of properties of the glass ceramic according to the invention even allows it to be used as dental material and in particular as material for preparing dental restorations.

The invention also relates to precursors of corresponding composition from which the glass ceramic with quartz solid solution phase according to the invention can be produced by heat treatment. These precursors are a correspondingly composed starting glass and a correspondingly composed starting glass with nuclei.

The term "corresponding composition" means that these precursors contain the same components in the same amounts as the glass ceramic, the components being calculated as oxides as is usual for glasses and glass ceramics, with the exception of fluorine.

The invention therefore also relates to a starting glass containing the components of the glass ceramic according to the invention with quartz solid solution phase.

The starting glass according to the invention therefore contains in particular suitable amounts of $SiO_2$, $Li_2O$, $K_2O$, $Al_2O_3$, $P_2O_5$ and $Zro_2$, which are required to form the glass ceramic with quartz solid solution phase according to the invention. Further, the starting glass may also contain other components as indicated above for the glass ceramic with quartz solid solution phase according to the invention. All such embodiments are preferred for the components of the starting glass which are also indicated as preferred for the components of the glass ceramic with quartz solid solution phase according to the invention.

Particularly preferably, the starting glass is in the form of a powder, a granulate or a powder compact pressed from a powder or granulate. In contrast to a glass monolith, such as is obtainable by pouring a glass melt into a mold, the starting glass in the above-mentioned forms has a large inner surface at which the subsequent crystallization of one and preferably several quartz solid solution phases can take place. This can have the advantage that in comparison to the crystallisation of glass monoliths fewer heat treatment steps are necessary in order to form one or more quartz solid solution phases.

The invention also relates to such a starting glass containing nuclei for the crystallization of quartz solid solution phase. Preferably, the starting glass also contains nuclei for the crystallization of lithium disilicate or lithium metasilicate.

The starting glass is produced in particular by melting a mixture of suitable starting materials, such as carbonates and oxides, at temperatures of in particular about 1500 to 1700° C. for 0.5 to 4 h. To achieve a particularly high homogeneity, the glass melt obtained can be poured into water to form a glass frit, and the frit obtained is then remelted.

The melt can then be poured into molds, e.g. steel or graphite molds, to produce blanks of the starting glass, so-called solid glass blanks or monolithic blanks. Typically, these monolithic blanks are first stress-relieved, e.g. by holding them at 800 to 1200° C. for 5 to 60 min, and then slowly cooled to room temperature.

In a preferred embodiment, the melt is poured into water to produce a frit. This glass frit can be processed into a powder or granulate by grinding. Preferably, the powder or granulate obtained in this way can be pressed into a blank, a so-called powder compact, optionally after addition of further components, such as coloring and fluorescent agents. By using several differently colored powders, multicolored blanks can be obtained in a simple manner, which have several areas with different color properties. The invention thus enables the production of highly esthetic multicolored dental restorations which can imitate the optical properties of the natural tooth material particularly well.

By heat treatment of the starting glass, the further precursor starting glass with nuclei can first be produced. The glass ceramic with quartz solid solution phase according to the invention can then be produced by heat treatment of this further precursor. Alternatively, the glass ceramic with quartz solid solution phase according to the invention can be formed by heat treatment of the starting glass.

It is preferred to subject the starting glass to a heat treatment at a temperature of 400 to 600° C., in particular 450 to 550° C., for a duration of in particular 5 to 120 min, preferably 10 to 60 min, to produce the starting glass with nuclei for crystallization of quartz solid solution phase.

It is further preferred to subject the starting glass or the starting glass with nuclei to at least one heat treatment at a temperature of 600 to 1000° C., preferably 650 to 900° C. and particularly preferably 750 to 900° C., for a duration of in particular 1 to 240 min, preferably 5 to 120 min and particularly preferably 10 to 60 min, in order to produce the glass ceramic with quartz solid solution phase. In a particularly preferred embodiment, the starting glass or the starting glass with nuclei is subjected to a first heat treatment at a temperature of 600 to 800° C., preferably 650 to 750° C. and particularly preferably 650 to 700° C., for a duration of in particular 1 to 120 min, preferably 5 to 120 min and particularly preferably 10 to 60 min, and then to a second heat treatment at a temperature of 750 to 950° C., preferably 800 to 900° C. and particularly preferably 800 to 850° C., for a duration of in particular 1 to 120 min, preferably 5 to 120 min and particularly preferably 10 to 60 min.

The invention therefore also relates to a process for production the glass ceramic with quartz solid solution phase according to the invention, in which the starting glass or the starting glass with nuclei, in particular in particulate form, preferably in the form of a powder and particularly preferably in the form of a powder compact, is subjected to at least one heat treatment in the range from 600 to 1000° C., preferably 650 to 900° C., for a duration of in particular 1 to 240 min, preferably 5 to 120 min and particularly preferably 10 to 60 min, and in particular is sintered.

The at least one heat treatment carried out in the process according to the invention can also be carried out in the course of hot pressing or sintering of the starting glass according to the invention or of the starting glass with nuclei according to the invention.

The glass ceramics according to the invention and the glasses according to the invention are present in particular as powders, granulates or blanks in any shape and size, e.g. monolithic blanks, such as platelets, cuboids or cylinders, or powder compacts. In these forms, they can be easily further processed, e.g. into dental restorations. However, they can also be in the form of dental restorations, such as inlays, onlays, crowns, veneers, facets or abutments.

Particularly preferably, the glass ceramics according to the invention are in the form of multicolored blanks, in particular multicolored presintered or sintered powder compacts.

Dental restorations, such as bridges, inlays, onlays, crowns, veneers, facets or abutments, can be produced from the glass ceramics according to the invention and the glasses according to the invention. The invention therefore also relates to their use in producing dental restorations, in particular multicolored dental restorations. It is preferred that the glass ceramic or the glass is given the shape of the desired dental restoration by pressing or machining.

The pressing is usually carried out at elevated pressure and temperature. It is preferred that the pressing is carried out at a temperature of 700 to 1200° C. It is further preferred that the pressing be carried out at a pressure of 2 to 10 bar. During pressing, the desired change in shape is achieved by viscous flow of the material used. The starting glass according to the invention, the starting glass according to the invention with nuclei and the glass ceramic according to the invention with quartz solid solution phase can be used for the pressing. In particular, the glasses and glass ceramics according to the invention can be used in the form of blanks of any shape and size, e.g. powder compacts, e.g. in unsintered, partially sintered or densely sintered form.

Machining is usually carried out by material-removing processes and in particular by milling and/or grinding. It is particularly preferred that the machining is carried out in a CAD/CAM process. The starting glass according to the invention, the starting glass with nuclei according to the invention and the glass ceramic with quartz solid solution phase according to the invention can be used for the machining. The glasses and glass ceramics according to the invention can be used in particular in the form of blanks, e.g. powder compacts, e.g. in unsintered, partially sintered or densely sintered form.

After the desirably shaped dental restoration has been produced, e.g. by pressing or machining, it can still be heat-treated to reduce the porosity, e.g. of a porous powder compact employed.

However, the glass ceramics according to the invention and the glasses according to the invention are also suitable as coating material of for example ceramics and glass ceramics. The invention is therefore likewise directed to the use of the glasses according to the invention or the glass ceramics according to the invention for coating, in particular ceramics and glass ceramics.

The invention also relates to a process for coating ceramics, metals, metal alloys and glass ceramics, in which glass ceramic according to the invention or glass according to the invention is applied to the corresponding substrate and subjected to elevated temperature.

This can be done in particular by sintering on or by joining an overlay produced by CAD-CAM with a suitable glass solder or adhesive and preferably by pressing on. In the case of sintering on, the glass ceramic or glass is applied in the usual manner, e.g. as a powder, to the material to be coated, such as ceramic or glass ceramic, and then sintered at elevated temperature. In the preferred pressing-on, glass ceramic according to the invention or glass according to the invention, for example in the form of powder compacts, is pressed on at an elevated temperature, of for example 700 to 1200° C., and with the application of pressure, for example 2 to 10 bar. In particular, the processes described in EP 231 773 and the pressing furnace disclosed therein can be used for this purpose. A suitable furnace is, for example the Programat EP 5000 from Ivoclar Vivadent AG, Liechtenstein.

Due to the above-described properties of the glass ceramics according to the invention and the glasses according to the invention, they are particularly suitable for use in dentistry. A further subject of the invention is therefore the use of the glass ceramics according to the invention or the glasses according to the invention as dental material, preferably for coating dental restorations and particularly preferably for producing dental restorations, such as bridges, inlays, onlays, veneers, abutments, partial crowns, crowns or facets.

The invention therefore also relates to a process for producing a dental restoration, in particular bridge, inlay, onlay, veneer, abutment, partial crown, crown or facet, in which the glass ceramic or glass according to the invention is given the shape of the desired dental restoration by pressing or by machining, in particular in a CAD/CAM process. Preferred is a multicolored dental restoration. With such a restoration, the optical properties of the natural tooth material can be imitated particularly well.

The invention is explained in more detail below by means of non-limiting examples.

EXAMPLES

Examples 1 to 9—Composition and Crystal Phases

A total of 9 glasses and glass ceramics according to the invention with the composition given in Table I were produced by melting of corresponding starting glasses and subsequent heat treatment for controlled crystallization.

The heat treatments applied are also given in Table I. The following meanings apply $T_g$ Glass transition temperature, determined by DSC $T_{Kb}$ and $t_{kb}$ Applied temperature and time for nucleation of the starting glass.

$T_c$ and $t_c$ Applied temperature and time for crystallization

For this purpose, the starting glasses were first melted from usual raw materials in a platinum-rhodium crucible at 1500 to 1700° C.

In Examples 1 to 3, the melts of the starting glasses were poured into graphite or steel molds to produce glass monoliths. These glass monoliths were stress relieved and slowly cooled to room temperature. They were then subjected to a first heat treatment at temperature $T_{Kb}$ for a duration $t_{kb}$ for nucleation and then to another heat treatment at temperature $T_c$ for a duration $t_c$ for crystallization.

In Examples 4 to 9, glass frits, i.e. glass granulates, were produced by pouring the molten starting glasses into water. The glass frits were ground to a particle size of <45 μm using ball or mortar mills and pressed into powder compacts using powder presses. The powder compacts were subjected optionally to a heat treatment at the temperature $T_{kb}$ for a duration of $t_{kb}$, to a first heat treatment at temperature $T_{c1}$ for a duration $t_{c1}$ and a second heat treatment at temperature $T_{c2}$ for a duration $t_{c2}$ for nucleation and crystallization.

In the following table I means:

QMK: Quartz solid solution phase

SP: Spodumene ($LiAlSi_2O_6$)

TABLE I

| Example | 1 | 2 | 3 |
|---|---|---|---|
| Composition | Wt.-% | Wt.-% | Wt.-% |
| $SiO_2$ | 62.5 | 65.0 | 66.1 |
| $Li_2O$ | 14.2 | 13.3 | 14.5 |
| $K_2O$ | 1.4 | 0.5 | 1.4 |
| $Al_2O_3$ | 2.4 | 3.6 | 2.0 |
| $P_2O_5$ | 5.4 | 4.5 | 5.8 |
| $ZrO_2$ | 10.1 | 13.0 | 7.2 |
| MgO | 3.0 | 0.1 | 0.5 |
| $B_2O_3$ | 1.0 | — | 2.5 |
| $T_g$ [° C.] | 490 | 531 | 488 |
| $T_{Kb}$ [° C] | 510 | 550 | 510 |
| $t_{kb}$ [min] | 10 | 10 | 10 |
| $T_C$ [° C.] | 800 | 800 | 810 |
| $t_C$ [min] | 30 | 30 | 30 |
| Crystal phases | $Li_2Si_2O_5$ QMK | $Li_2Si_2O_5$ QMK | $Li_2Si_2O_5$ QMK:SP |

TABLE I-continued

| Example | 4 | 5 | 6 | 7 |
|---|---|---|---|---|
| Composition | Wt.-% | Wt.-% | Wt.-% | Wt.-% |
| $SiO_2$ | 59.0 | 60.0 | 62.0 | 63.0 |
| $Li_2O$ | 16.0 | 17.5 | 16.0 | 14.2 |
| $K_2O$ | 1.3 | 1.0 | 1.5 | 1.2 |
| $Al_2O_3$ | 2.8 | 2.8 | 3.4 | 3.8 |
| $P_2O_5$ | 5.6 | 6.0 | 5.9 | 5.8 |
| $ZrO_2$ | 10.0 | 9.5 | 10.5 | 11.5 |
| MgO | 0.1 | 1.5 | 0.2 | 0.4 |
| $B_2O_3$ | 2.5 | 1.7 | 0.5 | 0.1 |
| $Y_2O_3$ | 0.1 | — | — | — |
| $Ce_2O_3$ | 1.0 | — | — | — |
| $V_2O_5$ | 0.4 | — | — | — |
| $Er_2O_3$ | 0.2 | — | — | — |
| $Tb_4O_7$ | 1.0 | — | — | — |
| $T_g$ [° C.] | 488 | 475 | 499 | 524 |
| $T_{C1}$ [° C.] | 750 | 750 | 750 | 750 |
| $t_{C1}$ [min] | 5 | 5 | 5 | 5 |
| $T_{C2}$ [° C.] | 880 | 880 | 880 | 880 |
| $t_{C2}$ [min] | 10 | 10 | 10 | 10 |

| Example | 8 | 9 |
|---|---|---|
| Composition | Wt.-% | Wt.-% |
| $SiO_2$ | 59.0 | 63.0 |
| $Li_2O$ | 16.0 | 14.2 |
| $K_2O$ | 1.3 | 1.2 |
| $Al_2O_3$ | 2.8 | 3.8 |
| $P_2O_5$ | 5.6 | 5.8 |
| $ZrO_2$ | 10.0 | 11.5 |
| MgO | 0.1 | 0.4 |
| $B_2O_3$ | 2.5 | 0.1 |
| $Y_2O_3$ | 0.1 | — |
| $Ce_2O_3$ | 1.0 | — |
| $V_2O_5$ | 0.4 | — |
| $Er_2O_3$ | 0.2 | — |
| $Tb_4O_7$ | 1.0 | — |
| $T_g$ [° C.] | 488 | 524 |
| $T_{Kb}$ [° C.] | 530 | — |
| $t_{kb}$ [min] | 30 | — |
| $T_{C1}$ [° C.] | 670 | 730 |
| $t_{C1}$ [min] | 120 | 60 |
| $T_{C2}$ [° C.] | 800 | 860 |
| $t_{C2}$ [min] | 60 | 60 |
| Crystal phases | $Li_2Si_2O_5$<br>QMK<br>$Li_3PO_4$<br>$Li_2SiO_3$ | $Li_2Si_2O_5$<br>QMK<br>$Li_3PO_4$ |

The invention claimed is:

1. A glass ceramic, which comprises the following components

| Component | Wt.-% |
|---|---|
| $SiO_2$ | 54.1 to 67.0 |
| $Li_2O$ | 13.1 to 18.5 |
| $K_2O$ | 0.1 to 2.0 |
| $Al_2O_3$ | 1.6 to 4.0 |
| $P_2O_5$ | 4.1 to 6.5 |
| $ZrO_2$ | 7.0 to 13.5 |
| MgO | 0.05 to 5.0 |

and comprises at least one quartz solid solution phase.

2. The glass ceramic according to claim 1, which comprises at least two different quartz solid solution phases.

3. The glass ceramic according to claim 1, which comprises at least one stoichiometric or non-stoichiometric aluminosilicate crystal phase(s).

4. The glass ceramic according to claim 1, which comprises 57.0 to 66.5 wt.-% $SiO_2$.

5. The glass ceramic according to claim 1, which comprises 13.3 to 18.0 wt.-% $Li_2O$.

6. The glass ceramic according to claim 1, which comprises 0.5 to 1.7 wt.-% $K_2O$.

7. The glass ceramic according to claim 1, which comprises 2.0 to 3.8 wt.-% $Al_2O_3$.

8. The glass ceramic according to claim 1, which comprises 4.3 to 6.0 wt.-% $P_2O_5$.

9. The glass ceramic according to claim 1, which comprises 7.2 to 13.0 wt.-% $Zro_2$.

10. The glass ceramic according to claim 1, which comprises 1.0 to 8.0 wt.-% oxide of monovalent elements $Me^{I}_2O$ selected from the group of $Na_2O$, $Rb_2O$, $Cs_2O$ and mixtures thereof.

11. The glass ceramic according to claim 1, which comprises 0.05 to 3.0 wt.-% MgO.

12. The glass ceramic according to claim 1, which comprises 0 to 5.0 wt.-% oxide of trivalent elements $Me^{III}_2O_3$ selected from the group of $B_2O_3$, $Y_2O_3$, $La_2O_3$, $Ga_2O_3$, $In_2O_3$, and mixtures thereof.

13. The glass ceramic according to claim 1, which comprises $SiO_2$ and $Li_2O$ in a molar ratio in the range of 1.5 to 6.0.

14. The glass ceramic according to claim 1, which comprises lithium disilicate or lithium metasilicate as main crystal phase.

15. The glass ceramic according to claim 1, which comprises at least 20 wt.-% lithium disilicate crystals.

16. The glass ceramic according to claim 1, which comprises 0.2 to 28 wt.-% of quartz solid solution.

17. A starting glass comprising the components of the glass ceramic according to claim 1.

18. The starting glass according to claim 17, which comprises nuclei for the crystallization of quartz solid solution phase and nuclei for the crystallization of lithium disilicate or lithium metasilicate.

19. The glass ceramic according to claim 1, wherein the glass ceramic is in the form of a powder, a granulate, a blank or a dental restoration.

20. A process for producing the glass ceramic according to claim 1, in which a starting glass in particulate form, is subjected to at least one heat treatment in the range from 600 to 1000° C.

21. A process for producing a dental restoration selected from a bridge, inlay, onlay, veneer, abutment, partial crown, crown or facet, in which the glass ceramic according to claim 1 is given the shape of the desired dental restoration by pressing or machining.

22. The glass ceramic according to claim 1, which comprises 0.07 to 1.5 wt.-% MgO.

23. The glass ceramic according to claim 1, which comprises 0 to 5.0 wt.-% $Nb_2O_5$.

* * * * *